Aug. 17, 1965   R. G. BRIGHT   3,200,448
SEALING STRIPS, BEADINGS OR MOULDINGS
Filed Feb. 1, 1962   2 Sheets-Sheet 1
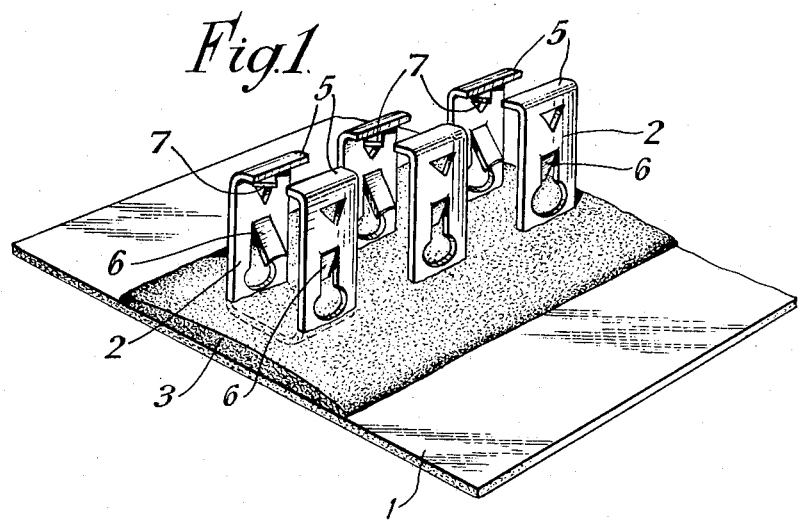
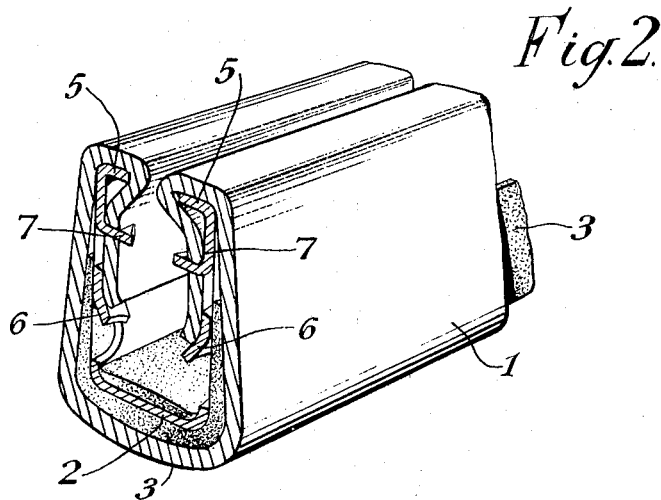
ROBERT GRANVILLE BRIGHT
INVENTOR
BY
DEAN, FAIRBANK & HIRSCH
ATTORNEYS Aug. 17, 1965    R. G. BRIGHT    3,200,448
SEALING STRIPS, BEADINGS OR MOULDINGS
Filed Feb. 1, 1962    2 Sheets-Sheet 2
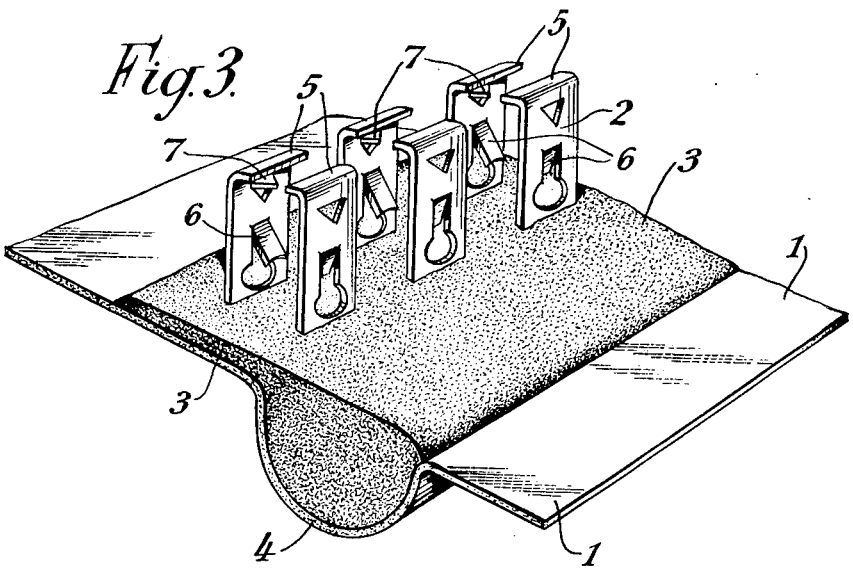
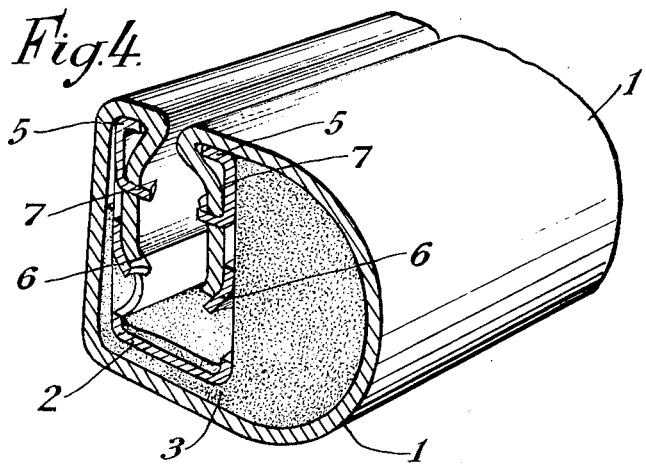
ROBERT GRANVILLE BRIGHT
INVENTOR
BY
DEAN, FAIRBANK & HIRSCH
ATTORNEYS

United States Patent Office 3,200,448
Patented Aug. 17, 1965

3,200,448
SEALING STRIPS, BEADINGS OR MOULDINGS
Robert G. Bright, Leamington Spa, England, assignor to Bright Manufacturing Company Limited, Coventry, England
Filed Feb. 1, 1962, Ser. No. 170,339
Claims priority, application Great Britain, Oct. 13, 1961, 36,834/61
6 Claims. (Cl. 20—69)

This invention relates to sealing strips, beadings or mouldings for use on motor vehicles, such components being used either as draught or weather excluders, or as ornamental or finishing trimming strips, the invention being concerned with the particular type of sealing strip, beading or moulding which includes a series of spring clips or tags of substantially inverted U shape which straddle a supporting flange and either frictionally engage the flange or alternatively make interlocking engagement with the flange or parts associated therewith. Alternatively a single continuous clip may be used of substantially inverted U shape.

Such sealing strips, beading or mouldings are usually mounted on flanges surrounding the door openings of motor vehicles or around motor vehicle boots and when used as draught or weather excluders are sandwiched between the door or lid and the supporting flange on which the sealing strip is mounted or otherwise engaged by the door or lid to produce the required sealing effect.

The chief object of the present invention is to evolve a sealing strip, beading or moulding hereinafter referred to as a strip or a generally improved but simplified construction and a method of manufacturing same whereby the strip can be quickly and easily produced by a continuous process.

Although any suitable form of substantially inverted U shaped clip may be used in continuous form and composed of strip metal, wire or other suitable material, it is preferred to employ a series of spaced individual substantially inverted U shaped clips bent up from spring steel and having pressed out tangs for frictionally engaging the flange. Alternatively such individual clips could be composed of wire or other suitable material.

The clips could for example take the form of the clips described in the specification of our co-pending British patent application No. 36,833/61, now British Patent No. 942,698, and carried by a longitudinally flexible spine to which the clips are attached. Alternatively, the clips could be connected by an integral spine having a width sufficiently narrow to permit the finished strip to be bent around curves of small radius, the integral spine serving merely to connect the clips together in correct spaced relationship.

Strips incorporating a series of substantially inverted U shaped clips include a length of fabric or other suitable ornamental covering material and when used for sealing purposes usually include an effective sealing portion composed of rubber or other suitable resilient material. It is usually necessary to incorporate also some form of filling material which will produce a smooth external appearance in the strip and avoid the clips showing through the comparatively thin covering material.

A strip in accordance with the present invention includes a clip or clips of substantially inverted U shape and a fabric or other covering, the covering having applied thereto a layer of plastic, rubber or other suitable material incorporating a foaming agent which will produce a layer of stable foam on the inner surface of the covering material subsequently to or during the application of the covering material to the clip or clips, thereby providing a resilient layer around the clip, or clips between said clip or clips and the covering.

Referring to the accompanying drawings:
FIGURE 1 is a perspective view illustrating the manufacture of a trimming strip in accordance with the invention;
FIGURE 2 is a fragmentary perspective view of the finished trimming strip;
FIGURE 3 is a similar view to FIGURE 1 but illustrating the manufacture of a draught excluding or sealing strip; and
FIGURE 4 is a fragmentary perspective view of the finished sealing strip.

In carrying out the invention as applied to a trimming or sealing strip, it is proposed to coat the covering material 1 on its inner surface with for example a dispersion of polyvinylchloride in a plasticiser together with a foaming agent. The coated covering material is then applied to the clip or clips 2 and the complete strip passed through an autoclave or otherwise heated to a temperature which will produce the desired foaming action and set the foam as a comparatively thick resilient lining 3. The resilient lining it is thought will hold or assist in holding the clip or clips in position, this being particularly desirable when a number of clips are employed suitably spaced apart throughout the length of the strip, the top of each clip being virtually embedded in the foam layer.

It is proposed to produce the strip as a continuous process, the covering material being fed forwardly from a drum on which it is wound into the path of the clips, the latter being carried by a suitably shaped guide and fed forwardly in correctly spaced relationship into a position in which they engage the coated surface of the covering material.

The plastic or other coating is preferably applied to the covering material as it is fed forwardly off the drum by means of a roller or similar device.

Instead of using a plastic, a solution of rubber latex may be employed to which is added a vulcanising agent, and accelerator and a suitable foaming agent.

In some cases, as for example if the strip is to be used as a sealing strip or weather excluder, it may be desirable to coat the covering material with a coating which will give a layer of foam of non-uniform thickness throughout the width of the covering material.

For example half or a part of the width of the covering material might be coated with a material having a small proportion of foaming agent and the rest of the width of the covering with a material to which a much higher proportion of foaming agent had been added. Consequently one part of the covering material would finally have a thick coating of foam whilst the other part had only a thin coating. The thick coating it is thought will have a good sealing effect when sandwiched between a door or lid and the flange, or otherwise engaged by the door or lid.

Alternatively as shown in FIGURE 3, the strip of covering material may be bent transversely to form a channel 4 which can contain a comparatively large quantity of the foam material which will as shown in FIGURE 4, form a thick resilient cushion on one side of the clips to provide an efficient seal.

As will be seen clearly in FIGURES 2 and 4 the foam material will provide a smooth exterior surface to the strip and will not in any way prevent the strip being bent around curves of small radius in either plane, the strip being therefore capable of universal bending movement.

The longitudinal edges of the covering material may be uncoated as shown so that they can be easily turned over the edges of the clips into the interior thereof, the inwardly turned edges being sandwiched between the lower edges of the clips and their supporting flange when the strip is in position thereon.

The clips 2 shown are each bent up from a blank of steel, aluminium or other suitable material, the blank being bent into inverted U shape, the extremities of the limbs being bent inwardly as at 5, the longitudinal edges of the covering being turned inwardly about the edges 5.

To hold the strip in position upon a supporting flange, each clip is formed with inwardly pressed tangs 6 which frictionally engage the opposite faces of the supporting flange. The tangs 6 are so inclined that the strip can be easily pressed into a position in which the clips straddle the flange, the tangs frictionally engaging the flange and effectively resisting accidental displacement.

The tanks 6 are preferably formed by first pressing holes in the blank and then pressing out the tangs. This has the advantage that the extremity of each tang is cleanly cut with two spaced comparatively sharp points.

To hold the covering in position each clip is formed with inwardly pressed tangs 7 which perforate the covering and if desired frictionally engage the supporting flange.

It will be appreciated that the clips will be suitably spaced apart along the length of the covering strip and if desired a number of dummy clips may be interposed between the flange gripping clips, which dummy clips will merely serve to support the covering material and consequently can be constructed from a comparatively cheap metal in comparison with the spring steel preferably used for the flange gripping clips, or from a suitable plastic material.

In some cases it may be possible to dispense with the tangs 6 and even the tangs 7 in which case the strip may be held in position upon the flange by the inherent resiliency of the clips, the longitudinal edges of the covering being sandwiched between the inwardly turned edges 5 of the clips and the supporting flange.

As previously mentioned the clips may alternatively be bent up from wire either as individual units or in the form of a continuous clip which is so formed as to be capable of universal bending movement.

I claim:

1. A sealing strip for application to a supporting flange comprising an elongated strip of fabric, a relatively thick layer of foam material defining a resilient strip extending longitudinally of said fabric strip and bonded thereto, a plurality of substantially U-shaped clips arranged in longitudinally spaced relation along said fabric strip, each of said clips comprising a cross piece and a pair of parallel legs each having an inwardly pressed tang adapted to engage said supporting flange only, the cross piece of each clip being embedded in said strip of foam material and extending transversely thereof, the longitudinal edge portions of said fabric strip being bent inwardly around the free ends of the legs of said clips into the interior thereof.

2. The combination set forth in claim 1 in which the legs of each clip have additional inwardly pressed tangs for perforating the inwardly turned portions of the fabric strip to secure the latter in position.

3. The combination set forth in claim 1 in which the foam material is of increased thickness adjacent one of the longitudinal edges of the fabric strip to form a resilient cushion against one side of one of the legs of said plurality of clips, whereby when said cushion is compressed it will provide a seal.

4. The method of constructing a sealing strip which consists of the steps of coating an elongated strip of fabric material with a layer of foam forming material to form an elongated strip of predetermined width on said fabric strip, feeding a plurality of U-shaped clips in equally spaced relation so as to extend in longitudinal alignment along said fabric strip with the cross piece of each clip embedded in the foam forming material and extending transversely of the fabric strip, thereupon heating the assembly to product the desired foaming action and to set the form as a relatively thick resilient layer and then bending the longitudinal edge portions of the fabric strip over the free ends of the legs of the clip into the interior thereof.

5. The combination set forth in claim 4 in which the foam forming material is a dispersion of polyvinylchloride in a plasticiser together with a foaming agent.

6. In the method of constructing a sealing strip set forth in claim 4, the steps of forming said fabric strip with a longitudinal depression offset from its longitudinal center line and adjacent one of the edges of the fabric strip so that the foam forming material will fill such depression and initially positioning the clips so that they are located between the depression and the other edge of the longitudinal strip, the foam material in the depression forming a sealing portion.

References Cited by the Examiner

UNITED STATES PATENTS 2,954,310   9/60   Truesdell et al. _____ 154—43

FOREIGN PATENTS 766,362   1/57   Great Britain.
838,054   6/60   Great Britain.

EARL M. BERGERT, *Primary Examiner.*